United States Patent
Hill et al.

(10) Patent No.: US 11,762,583 B2
(45) Date of Patent: Sep. 19, 2023

(54) SYSTEM AND METHOD FOR SELECTIVELY THROTTLING COMMANDS WITHIN A STORAGE SYSTEM

(71) Applicant: EMC IP Holding Company, LLC, Hopkinton, MA (US)

(72) Inventors: Kenneth Hill, Milford, MA (US); Stephen Henderson, Groton, MA (US); Daniel B. Lewis, Auburndale, MA (US); Michael P. Wahl, Bulverde, TX (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 32 days.

(21) Appl. No.: 17/077,060

(22) Filed: Oct. 22, 2020

(65) Prior Publication Data

US 2022/0129193 A1 Apr. 28, 2022

(51) Int. Cl.
*G06F 3/06* (2006.01)

(52) U.S. Cl.
CPC .......... *G06F 3/0659* (2013.01); *G06F 3/0608* (2013.01); *G06F 3/0626* (2013.01); *G06F 3/0673* (2013.01)

(58) Field of Classification Search
CPC .... G06F 3/0659; G06F 3/0608; G06F 3/0626; G06F 3/0673
See application file for complete search history.

(56) References Cited

U.S. PATENT DOCUMENTS

| | | | |
|---|---|---|---|
| 6,421,723 B1 * | 7/2002 | Tawil | H04L 43/0876 709/224 |
| 2013/0297852 A1 * | 11/2013 | Fai | G06F 3/0659 711/E12.008 |
| 2017/0075572 A1 * | 3/2017 | Utevsky | G06F 3/0688 |
| 2017/0351438 A1 * | 12/2017 | Lee | G06F 12/0246 |
| 2018/0213036 A1 * | 7/2018 | Vasetsky | H04L 67/1097 |
| 2019/0171389 A1 * | 6/2019 | Muthiah | G06F 12/0246 |
| 2020/0004703 A1 * | 1/2020 | Sankaran | G06F 13/4234 |
| 2021/0181989 A1 * | 6/2021 | Jung | G06F 3/067 |
| 2022/0019352 A1 * | 1/2022 | Tripathi | G06F 3/0611 |

\* cited by examiner

*Primary Examiner* — Sean D Rossiter
(74) *Attorney, Agent, or Firm* — Brian J. Colandreo; Heath M. Sargeant; Holland & Knight LLP

(57) ABSTRACT

A method, computer program product, and computing system for receiving, at a storage system, a command from a host. A command type of the command may be determined. It may be determined if a threshold associated with the command type has been met. In response to determining that the threshold associated with the command type has been met, a command queue full response may be sent, from the storage system, to the host.

18 Claims, 4 Drawing Sheets

SYSTEM AND METHOD FOR SELECTIVELY THROTTLING COMMANDS WITHIN A STORAGE SYSTEM

BACKGROUND

Storing and safeguarding electronic content may be beneficial in modern business and elsewhere. Accordingly, various methodologies may be employed to protect and distribute such electronic content.

Storage systems may interact with one or more hosts that send various commands (e.g., IO requests, storage protocol-specific commands, etc.) of various command types. Commands are typically sent from a host to a storage system without requiring the command to complete before the host sends additional commands. However, some types of commands may require significantly more processing resources of a storage system to execute than other types of commands. According to conventional approaches, the storage system may be unable to request that hosts throttle particular types of commands.

SUMMARY OF DISCLOSURE

In one example implementation, a computer-implemented method executed on a computing device may include, but is not limited to, receiving, at a storage system, a command from a host. A command type of the command may be determined. It may be determined if a threshold associated with the command type has been met. In response to determining that the threshold associated with the command type has been met, a command queue full response may be sent, from the storage system, to the host.

One or more of the following example features may be included. Determining if a threshold associated with the command type has been met may include one or more of: determining if at least a threshold amount of memory for commands for the command type has been met; and determining if at least a threshold number of commands for the command type are being processed. Determining if at least a threshold number of commands for the command type are being processed may include incrementing a number of commands being processed for the command type for each command received; and comparing the number of commands being processed for the command type to the threshold number of commands for the command type. The command received from the host may be a command of the Small Computer System Interface (SCSI) storage protocol. The command type may include a SCSI unmap command. The command queue full response may be a SCSI queue full response. The host may be configured to respond to the command queue full response by throttling the sending of subsequent commands to the storage system.

In another example implementation, a computer program product resides on a computer readable medium that has a plurality of instructions stored on it. When executed by a processor, the instructions cause the processor to perform operations that may include, but are not limited to, receiving, at a storage system, a command from a host. A command type of the command may be determined. It may be determined if a threshold associated with the command type has been met. In response to determining that the threshold associated with the command type has been met, a command queue full response may be sent, from the storage system, to the host.

One or more of the following example features may be included. Determining if a threshold associated with the command type has been met may include one or more of: determining if at least a threshold amount of memory for commands for the command type has been met; and determining if at least a threshold number of commands for the command type are being processed. Determining if at least a threshold number of commands for the command type are being processed may include incrementing a number of commands being processed for the command type for each command received; and comparing the number of commands being processed for the command type to the threshold number of commands for the command type. The command received from the host may be a command of the Small Computer System Interface (SCSI) storage protocol. The command type may include a SCSI unmap command. The command queue full response may be a SCSI queue full response. The host may be configured to respond to the command queue full response by throttling the sending of subsequent commands to the storage system.

In another example implementation, a computing system includes at least one processor and at least one memory architecture coupled with the at least one processor, wherein the at least one processor is configured to receive, at a storage system, a command sent from a host, wherein the at least one processor is further configured to determine a command type of the command, wherein the at least one processor is further configured to determine if a threshold associated with the command type has been met, and wherein the at least one processor is further configured to, in response to determining that the threshold associated with the command type has been met, send, from the storage system, a command queue full response to the host.

One or more of the following example features may be included. Determining if a threshold associated with the command type has been met may include one or more of: determining if at least a threshold amount of memory for commands for the command type has been met; and determining if at least a threshold number of commands for the command type are being processed. Determining if at least a threshold number of commands for the command type are being processed may include incrementing a number of commands being processed for the command type for each command received; and comparing the number of commands being processed for the command type to the threshold number of commands for the command type. The command received from the host may be a command of the Small Computer System Interface (SCSI) storage protocol. The command type may include a SCSI unmap command. The command queue full response may be a SCSI queue full response. The host may be configured to respond to the command queue full response by throttling the sending of subsequent commands to the storage system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
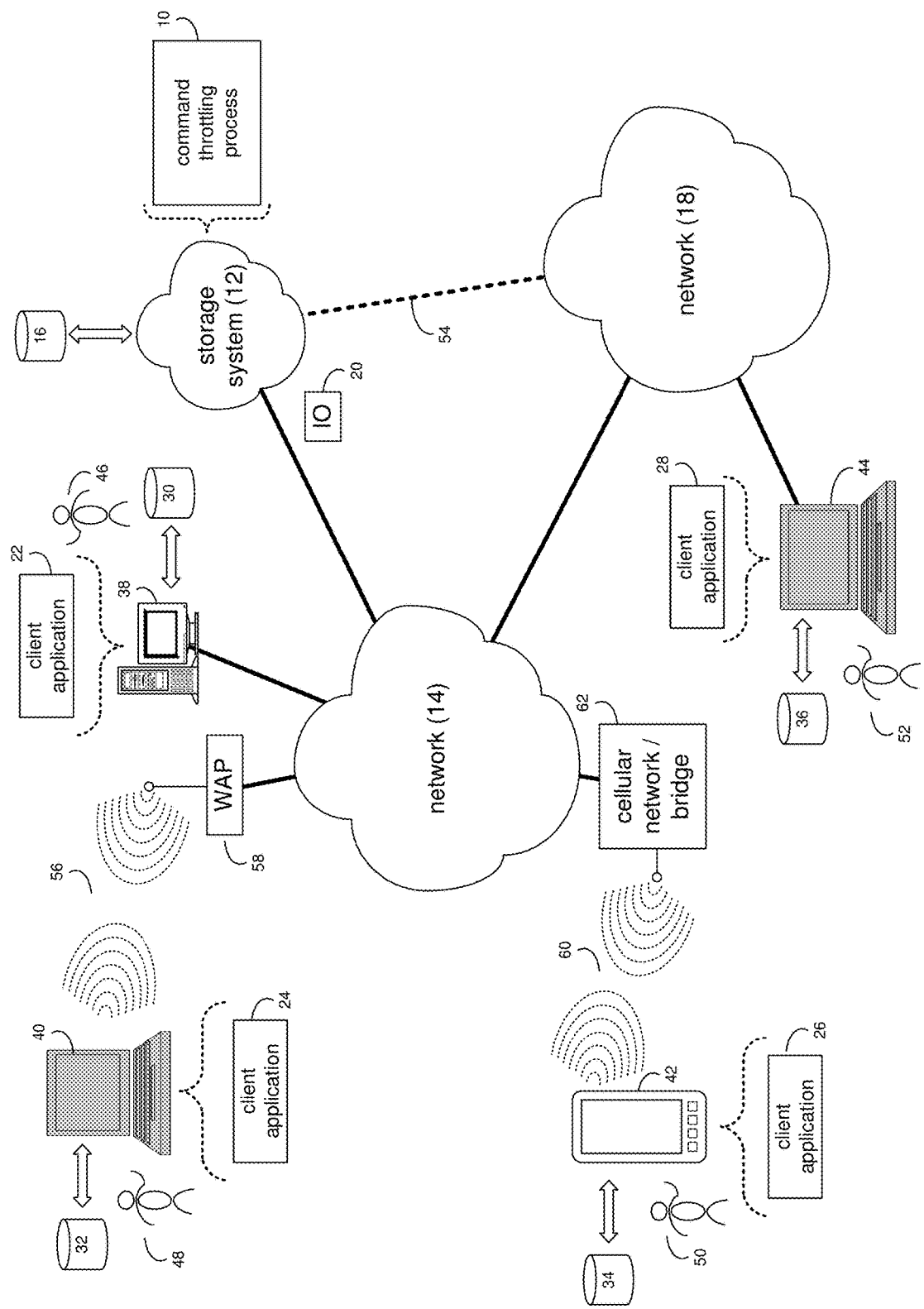
FIG. 1 is an example diagrammatic view of a storage system and a command throttling process coupled to a distributed computing network according to one or more example implementations of the disclosure.

Referring to FIG. 1, there is shown command throttling process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of command throttling process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of command throttling process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a command throttling process, such as command throttling process 10 of FIG. 1, may include but is not limited to, receiving, at a storage system, a command from a host. A command type of the command may be determined. It may be determined if a threshold associated with the command type has been met. In response to determining that the threshold associated with the command type has been met, a command queue full response may be sent, from the storage system, to the host.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
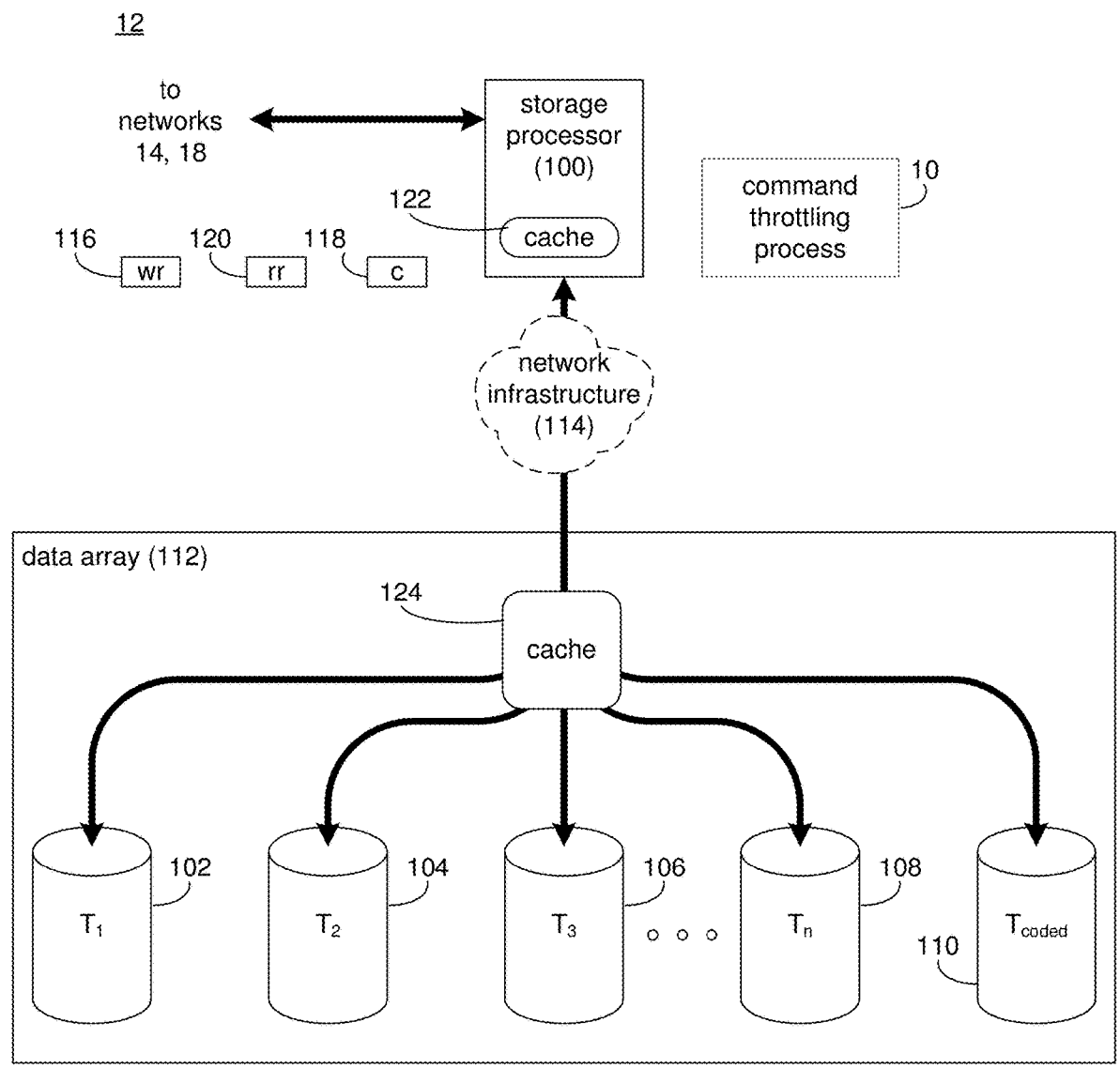
FIG. 2 is an example diagrammatic view of the storage system of FIG. 1 according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of command throttling process 10. The instruction sets and subroutines of command throttling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of command throttling process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of command throttling process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of command throttling process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Command Throttling Process

Figure 3:
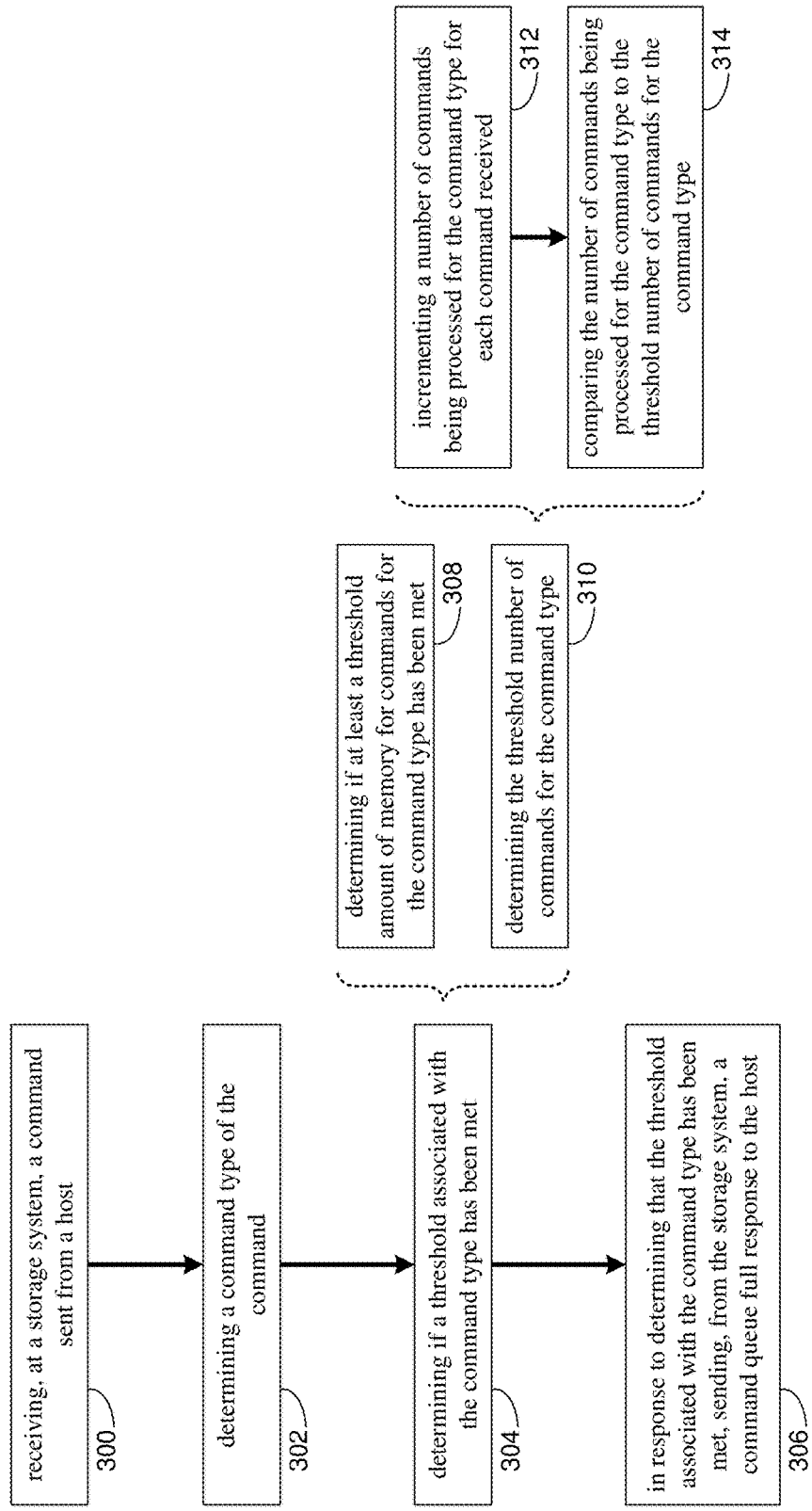
FIG. 3 is an example flowchart of command throttling process according to one or more example implementations of the disclosure.
Figure 4:
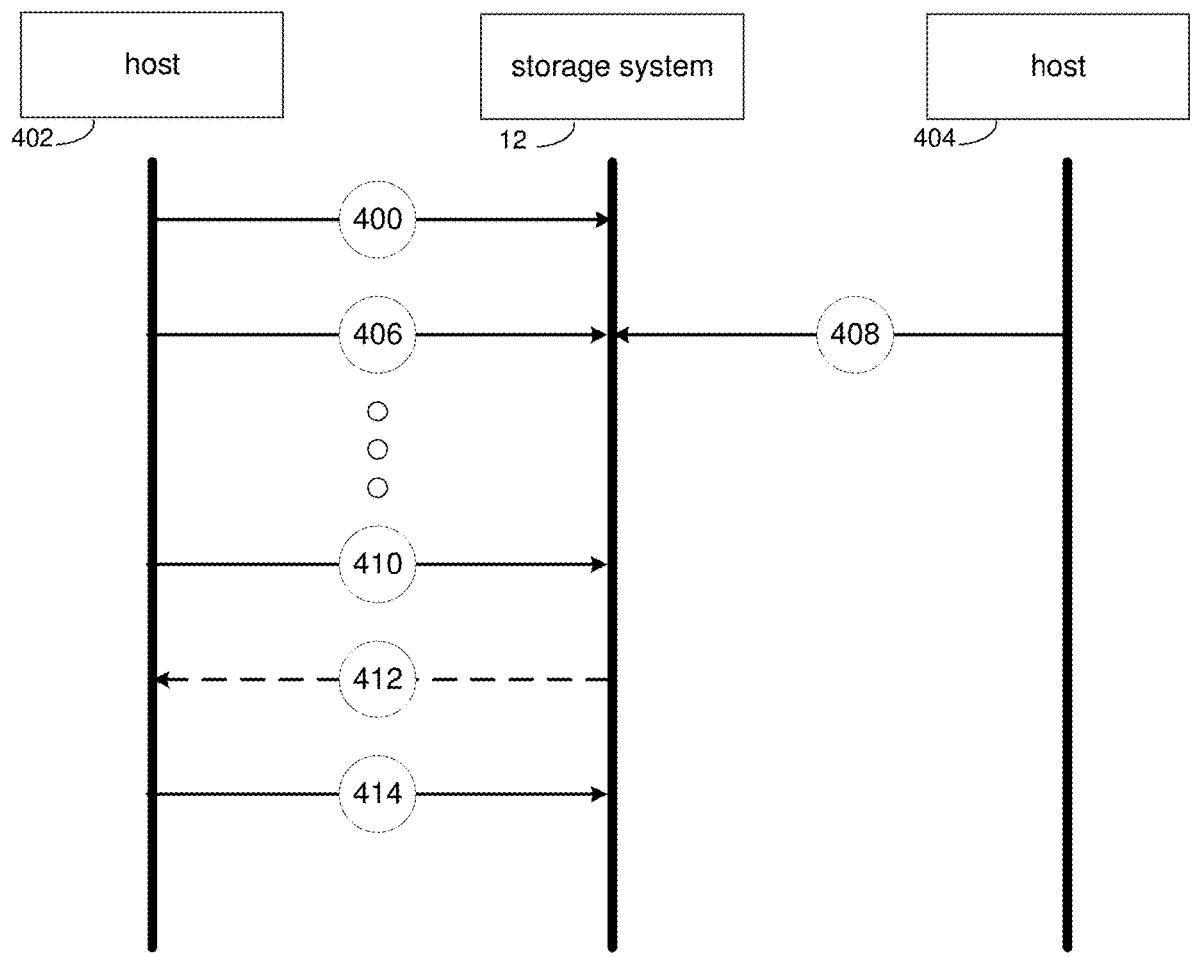
FIG. 4 is an example flowchart of command throttling process according to one or more example implementations of the disclosure.

Referring also to the examples of FIGS. 3-4 and in some implementations, command throttling process 10 may receive 300, at a storage system, a command from a host. A command type of the command may be determined 302. It may be determined 304 if a threshold associated with the command type has been met. In response to determining that the threshold associated with the command type has been met, a command queue full response may be sent 306, from the storage system, to the host.

As will be discussed in greater detail below, implementations of the present disclosure may allow for selective throttling of particular command types of various commands. For example, conventional storage systems interact with one or more hosts that send various commands (e.g., IO requests, storage protocol-specific commands, etc.) of various command types. Commands are typically sent from a host to a storage system without requiring the command to complete before the host sends additional commands. However, some types of commands may require significantly more processing resources of a storage system to execute than other types of commands. According to conventional approaches, the storage system may be unable to request that hosts throttle particular types of commands.

In some implementations, command throttling process 10 may receive 300, at a storage system, a command from a host. As discussed above and in some implementations, one or more hosts may be communicatively coupled to a storage system and configured to provide commands to the storage system. In some implementations, a host may generally include a data storage device or server that is configured to communicate with one or more client electronic devices and one or more storage systems. For example, commands from a client electronic device may be sent to a host which may interface with a storage system. In some implementations, a host may be configured to allow multiple operating systems or virtual machines to run simultaneously on a single system. In some implementations, a command may generally include any request for the storage system and/or a component of the storage system to perform a service. As will be discussed in greater detail below, each command may be specific to a storage protocol and may include various types.

Referring also to the example of FIG. 4 and in some implementations, command throttling process 10 may receive 300, at a storage system (e.g., storage system 12), a command (e.g., command 400) from a host (e.g., host 402). In some implementations and as shown in FIG. 4, storage system 12 may be communicatively coupled to one or more hosts (e.g., hosts 402, 404). While an example of e.g., two hosts have been provided, it will be appreciated that any number of hosts may be communicatively coupled to a storage system within the scope of the present disclosure.

In some implementations, command throttling process 10 may determine 302 a command type of the command. As discussed above and in some implementations, a command may include various command types. For example, a command type may specify the operations and/or services a host is requesting that a storage system perform. In some implementations, command types may be specific to a particular storage protocol. In some implementations, the command received from the host may be a command of the Small Computer System Interface (SCSI) storage protocol. As is known in the art, the SCSI storage protocol is a set of standards for physically connecting and transferring data between computers and peripheral devices. The SCSI storage protocol define commands, electrical, optical and logical interfaces. Examples of command types for the SCSI storage protocol may include, but are not limited to, read commands, write commands, copy commands, unmap commands, etc.

In some implementations, command throttling process 10 may determine 302 the command type of the command in response to receiving 300 the command at the storage system. For example, a storage processor may be configured to read the command and determine 302 the command type of the command and determine how to execute the command as it pertains to the storage devices of the storage system.

In some implementations, the command type may include a SCSI unmap command. As is known in the art, a SCSI unmap command may be used by host operating systems to free space on thinly provisioned storage volumes of the storage system when the host deletes files on a file system that resides on that volume. In cases where large numbers of large files are deleted concurrently, host operating systems may generate substantial counts of SCSI unmap commands to allow the previously used space to be reclaimed. These operations may be managed by a host operating system on a per volume, per host basis. However, if the number of hosts, number of volumes, and/or number of files being deleted are large enough, the number of outstanding commands generated may exceed the efficient processing capacity of the storage system presenting the volumes.

Referring again to the example of FIG. 4 and in some implementations, command throttling process 10 may receive 300 command 400 from host 402. In this example, command throttling process 10 may determine 302 the command type of command 400. Suppose, for example purposes only, that command throttling process 10 determines 302 that command 400 is a SCSI unmap command. In some implementations, storage system 12 may determine, based on command 400, which blocks of portions of data are no longer considered in use and can be wiped internally. While an example of a SCSI unmap command has been provided for the command type of command 400, it will be appreciated that any command type may be determined 302 within the scope of the present disclosure.

In some implementations, command throttling process 10 may determine 304 if a threshold associated with the command type has been met. In some implementations and as discussed above, certain command types may require significant processing resources of a storage system to execute. In some implementations, commands of these command types may be received by a storage system at such high rates, that the storage system may be unable to process commands in an efficient manner. Accordingly, command throttling process 10 may determine one or more thresholds associated with a command type. In this manner and as will be discussed in greater detail below, command throttling process 10 may selectively throttle commands for a particular command type based upon, at least in part, a threshold associated with the command type.

In some implementations, determining 304 if a threshold associated with the command type has been met may include determining 308 if at least a threshold amount of memory for commands for the command type has been met. For example, various command types may require varying amounts of processing resources or amount of work required to process them on a per command basis. In one example, a one megabyte SCSI unmap command may require fewer resources than e.g., a 32 megabyte SCSI unmap command. In some implementations, the threshold amount of memory for a particular command type may be user-defined (e.g., via a user interface) and/or may be defined automatically by command throttling process 10 determining the processing capability of the storage system.

In one example, command throttling process 10 may determine that a storage system may be configured to process a threshold of e.g., 128 megabytes of SCSI unmap commands at one time. In this example, if command throttling process 10 receives 300 e.g., five SCSI unmap commands of e.g., 32 MB, command throttling process 10 may determine that at least a threshold amount of memory for commands for the command type has been met. In another example, suppose command throttling process 10 receives 300 e.g., 129 SCSI unmap commands at one megabyte each. Command throttling process 10 may determine that at least a threshold amount of memory for commands for the command type has been met (e.g., the 128 megabyte threshold determined for SCSI unmap commands). While one example of a threshold amount of memory has been provided for a SCSI unmap command type, it will be appreciated that any threshold amount of memory may be used within the present disclosure for any command type.

In some implementations, determining 304 if a threshold associated with the command type has been met may include determining 310 if at least a threshold number of commands for the command type are being processed. Accordingly, command throttling process 10 may determine a threshold number of commands for the command type for the storage system to process at a given time. In some implementations, the threshold number of commands for a particular command type may be user-defined (e.g., via a user interface) and/or may be defined automatically by command throttling process 10 determining the processing capability of the storage system.

Referring again to the example of FIG. 4 and in some implementations, suppose command throttling process 10 determines a threshold number of commands for the SCSI unmap command type for storage system 12. In this example, suppose command throttling process 10 determines a threshold of e.g., 20 SCSI unmap commands (e.g., manually via a user-interface or automatically). In other words, command throttling process 10 may determine that storage system 12 may process e.g., 20 SCSI unmap commands at a given time. While an example of 20 SCSI unmap commands has been provided for a threshold number of commands of a command type, it will be appreciated that command throttling process 10 may determine any threshold number of commands for any command type within the scope of the present disclosure.

In some implementations, determining 310 if at least a threshold number of commands for the command type are being processed may include incrementing 312 a number of commands being processed for the command type for each command received. For example, command throttling process 10 may include one or more counters for each command type for which a threshold number of commands has been determined. In this manner, command throttling process 10 may increment 312 a count or number of commands being processed for the command type of each command received. In some implementations, the one or more counter for each command type may be configured to maintain a count of the number of commands of a particular command type that are waiting to be processed by the storage system. In this manner, when a command has been executed, command throttling process 10 may decrement the number of commands being processed for the command type by e.g., one. In some implementations, command throttling process 10 may compare 314 the number of commands being processed for the command type to the threshold number of commands for that command type.

Referring again to the example of FIG. 4 and as discussed above, suppose command throttling process 10 receives 300 at storage system 12, command 400 from host 402 and that command throttling process 10 determines 302 command 400 to be a SCSI unmap command. Command throttling process 10 may increment 312 a number of commands received for the SCSI unmap command type by one. Command throttling process 10 may compare 314 the number of commands received for the SCSI unmap command type to the threshold number of commands for the SCSI unmap command type. For example, command throttling process 10 may determine that one SCSI unmap command is being processed and that the threshold of 20 SCSI unmap commands being processed has not been met or exceeded. Accordingly, command throttling process 10 may continue to execute commands of the SCSI unmap command type from hosts 402 and 404.

Now suppose that command throttling process 10 receives 300 command 406 from host 402 and determines 302 that command 406 is a SCSI unmap command. In this example, command throttling process 10 may increment 312 the number of commands being processed for the SCSI unmap command type and may compare 314 the number of commands being processed for the SCSI unmap command type to the threshold number of commands for the SCSI unmap command type. In this example, command throttling process 10 may determine that two SCSI unmap commands are being processed and that the threshold of 20 SCSI unmap commands being processed has not been met or exceeded.

Further, suppose command throttling process 10 receives 300 command 408 from host 404 and determines 302 that command 408 is a SCSI unmap command. In this example, command throttling process 10 may increment 312 the number of commands being processed for the SCSI unmap command type and may compare 314 the number of commands being processed for the SCSI unmap command type to the threshold number of commands for the SCSI unmap command type. In this example, command throttling process 10 may determine that three SCSI unmap commands are being processed and that the threshold of 20 SCSI unmap commands being processed has not been met or exceeded.

In some implementations, command throttling process 10 may, in response to determining that the threshold associated with the command type has been met, send 306, from the storage system, a command queue full response to the host. In some implementations, command throttling process 10 may organize the one or more commands received by the storage system in a queue. In some implementations, a queue full response may indicate that the queue for storing commands at the storage system is full. In some implementations, the command queue full response may be a SCSI queue full response. For example, the SCSI protocol has a defined response a target may return when it reaches resource constraint limits. This is typically managed by tracking the total count of commands to a logical unit on a target and responding with a SCSI queue full response when a threshold count of commands is exceeded. In some implementations, command throttling process 10 may utilize a SCSI queue full response to request that a host throttle the sending of subsequent commands to the storage system. In this manner, command throttling process 10 may send 306 a command queue full response to a host to selectively throttle commands of a particular command type when a threshold number of commands of that command type are being processed by the storage system.

Continuing with the above example, suppose that command throttling process 10 receives 300 e.g., 16 additional SCSI unmap commands from host 402 before receiving command 410. In this example, suppose that command throttling process 10 determines 302 that command 410 is a SCSI unmap command. In this example, command throttling process 10 may increment 312 the number of commands being processed for the SCSI unmap command type and may compare 314 the number of commands being processed for the SCSI unmap command type to the threshold number of commands for the SCSI unmap command type. In this example, command throttling process 10 may determine 310 that 20 SCSI unmap commands are being processed and that the threshold number of 20 SCSI unmap commands has been met. Command throttling process 10 may send 306 a command queue full response (e.g., command queue full response 412) to host 402.

In some implementations, the host may be configured to respond to the command queue full response by throttling the sending of subsequent commands to the storage system. For example, a host may throttle down subsequent commands based upon, at least in part, an exponential back-off of attempted command queue depths. In some implementations, a host may be configured to determine whether a threshold number of command queue full responses have been received before throttling an attempted command queue depth of commands to send from the host. In this manner, when a host receives at least a threshold number of command queue full responses from the storage system, host 402 may be configured to decrease the attempted command queue depth by a predefined amount (e.g., reduce the attempted command queue depth by 50%). In some implementations, host 402 may be configured with various back-off thresholds within the scope of the present disclosure.

In some implementations, host 402 may be configured to throttle up subsequent commands to the storage system based upon, at least in part, a threshold number of commands sent to the storage system that do not result in a command full queue response. In some implementations, when a host sends at least a threshold number of commands to the storage system that do not result in a command queue full response from the storage system, command throttling process 10 may increase the attempted command queue depth by a predefined amount (e.g., increase the attempted command queue depth by one command). In some implementations, host 402 may be configured with various throttle up thresholds within the scope of the present disclosure.

Referring again to the example of FIG. 4 and in some implementations, in response to receiving command queue full response 412, host 402 may be configured to throttle the sending of subsequent commands to the storage system. In this example, host 402 may reduce the size of the host's attempted command queue depth by a predefined amount (e.g., reduce by 50%). Accordingly, the rate at which host 402 sends subsequent commands to storage system 12 may be throttled.

In some implementations, when a command queue full response is sent to a host regarding a particular command type, command throttling process 10 may continue to process commands of other command types as discussed above. Continuing with the above example, suppose host 402 sends command 414. In this example, command throttling process 10 may receive 300 command 414 from host 402 and determines 302 that command 414 is a read command. In this example, command throttling process 10 may increment 312 the number of commands being processed for the read command type and may compare 314 the number of commands being processed for the read command type to the threshold number of commands for the read command type. In this example, suppose that command throttling process 10 determines that the number of read commands being processed does not exceed a threshold number of commands for the read command type. In this example, command throttling process 10 may process command 414. In this manner, command throttling process 10 may selectively throttle specific types of commands on a storage system based upon, at least in part, a command type while allowing commands of other command types to be processed by the storage system.

In some implementations, while reference has been made to thresholds and counts of commands of particular command types for a storage system generally, it will be appreciated that, in some implementations, the thresholds and counts of commands of particular command types may be determined and/or maintained on a per host-basis, a group of hosts-basis, and/or may be different between hosts or groups of hosts. This may allow for policies, either static or dynamic, that may, for example, allocate a first portion of the storage system's capacity for a given command type to one host and a second portion of the storage system's capacity for the command type to another host.

For example and referring again to FIG. 4, command throttling process 10 may allocate e.g., 60% of the overall storage system capacity for a given command type to host 402 and e.g., 40% of the overall storage system capacity for the command type to host 404. In some implementations, command throttling process 10 may enforce a policy where any given host is not allowed to consume more than a certain portion of the storage system's capacity for a particular command type. For example, command throttling process 10 may define and enforce a policy that limits the execution of commands received from host 402 to no more than e.g. 50% of the overall storage system capacity for the command type. In this manner, command throttling process 10 may selectively throttle commands of a particular command type for a specific host or group of hosts.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    receiving, at a storage system, a plurality of commands sent from a host;
    determining a command type for each of the plurality of commands;
    determining, for each command, if a threshold associated with the command type has been met;
    in response to determining that the threshold associated with the command type has been met, sending, from the storage system, a command queue full response to the host for each command of the command type that has met the associated threshold, wherein the host is configured to respond to the command queue full response by throttling sending of subsequent commands to the storage system, wherein throttling includes:
        determining a threshold number of command queue full responses have been received, and
        throttling an attempted command queue depth of commands to send from the host; and
    processing the plurality of commands of command types that have not met the associated threshold.

2. The computer-implemented method of claim 1, wherein determining if a threshold associated with the command type has been met includes one or more of:
    determining if at least a threshold amount of memory for commands for the command type has been met; and
    determining if at least a threshold number of commands for the command type are being processed.

3. The computer-implemented method of claim 2, wherein determining if at least a threshold number of commands for the command type are being processed includes:
    incrementing a number of commands being processed for the command type for each command received; and
    comparing the number of commands being processed for the command type to the threshold number of commands for the command type.

4. The computer-implemented method of claim 1, wherein the plurality of commands received from the host include one or more commands of the Small Computer System Interface (SCSI) storage protocol.

5. The computer-implemented method of claim 4, wherein the command type includes a SCSI unmap command.

6. The computer-implemented method of claim 4, wherein the command queue full response is a SCSI queue full response.

7. A computer program product residing on a non-transitory computer readable medium having a plurality of instructions stored thereon which, when executed by a processor, cause the processor to perform operations comprising:
    receiving, at a storage system, a plurality of commands sent from a host;
    determining a command type for each of the plurality of commands;
    determining, for each command, if a threshold associated with the command type has been met;
    in response to determining that the threshold associated with the command type has been met, sending, from the storage system, a command queue full response to the host for each command of the command type that has met the associated threshold, wherein the host is configured to respond to the command queue full response by throttling sending of subsequent commands to the storage system, wherein throttling includes:
        determining a threshold number of command queue full responses have been received, and
        throttling an attempted command queue depth of commands to send from the host; and
    processing the plurality of commands of command types that have not met the associated threshold.

8. The computer program product of claim 7, wherein determining if a threshold associated with the command type has been met includes one or more of:
    determining if at least a threshold amount of memory for commands for the command type has been met; and
    determining if at least a threshold number of commands for the command type are being processed.

9. The computer program product of claim 8, wherein determining if at least a threshold number of commands for the command type are being processed includes:
    incrementing a number of commands being processed for the command type for each command received; and
    comparing the number of commands being processed for the command type to the threshold number of commands for the command type.

10. The computer program product of claim 7, wherein the plurality of commands received from the host include one or more commands of the Small Computer System Interface (SCSI) storage protocol.

11. The computer program product of claim 10, wherein the command type includes a SCSI unmap command.

12. The computer program product of claim 10, wherein the command queue full response is a SCSI queue full response.

13. A computing system comprising:
    a memory; and
    a processor configured to receive, at a storage system, a plurality of commands sent from a host, wherein the processor is further configured to determine a command type for each of the plurality of commands, wherein the processor is further configured to determine, for each command, if a threshold associated with the command type has been met, wherein the processor is further configured to, in response to determining that the threshold associated with the command type has been met, sending, from the storage system, a command queue full response to the host for each command of the command type that has met the associated threshold, wherein the host is configured to respond to the command queue full response by throttling sending of subsequent commands to the storage system, wherein throttling includes: determining a threshold number of command queue full responses have been received, and throttling an attempted command queue depth of command to send from the host, and wherein the processor is further configured to process the plurality of commands of command types that have not met the associated threshold.

14. The computing system of claim 13, wherein determining if a threshold associated with the command type has been met includes one or more of:
  determining if at least a threshold amount of memory for commands for the command type has been met; and
  determining if at least a threshold number of commands for the command type are being processed.

15. The computing system of claim 14, wherein determining if at least a threshold number of commands for the command type are being processed includes:
  incrementing a number of commands being processed for the command type for each command received; and
  comparing the number of commands being processed for the command type to the threshold number of commands for the command type.

16. The computing system of claim 13, wherein the plurality of commands received from the host include one or more commands of the Small Computer System Interface (SCSI) storage protocol.

17. The computing system of claim 16, wherein the command type includes a SCSI unmap command.

18. The computing system of claim 16, wherein the command queue full response is a SCSI queue full response.

* * * * *